United States Patent [19]

Muffoletto et al.

[11] Patent Number: 5,716,735
[45] Date of Patent: Feb. 10, 1998

[54] TWIN PLATE CATHODE ASSEMBLY FOR MULTIPLATE, ELECTROCHEMICAL CELLS

[75] Inventors: Barry Muffoletto, Alden; Ray Kuwik, Lancaster, both of N.Y.

[73] Assignee: Wilson Greatbatch Ltd., Clarence, N.Y.

[21] Appl. No.: 681,823

[22] Filed: Jul. 29, 1996

Related U.S. Application Data

[63] Continuation of Ser. No. 757,251, Sep. 10, 1991, abandoned.
[51] Int. Cl.$^6$ .................................................. H01M 2/26
[52] U.S. Cl. ........................... 429/161; 429/211; 29/623.4
[58] Field of Search .................................. 429/161, 211, 429/194, 94; 29/623.4

[56] References Cited

U.S. PATENT DOCUMENTS

| | | | |
|---|---|---|---|
| 4,209,576 | 6/1980 | Heurtel | 429/211 X |
| 4,830,940 | 5/1989 | Keister et al. | 429/194 |
| 5,250,373 | 10/1993 | Muffoletto et al. | 429/161 |

*Primary Examiner*—Stephen Kalafut
*Attorney, Agent, or Firm*—Hodgson, Russ, Andrews, Woods & Goodyear LLP

[57] ABSTRACT

A twin plate cathode structure (53) for use in an alkali metal/solid and alkali metal/oxyhalide cell assembly includes a plurality of cathode plates (54a, 54b) operatively associated with an anode (31), the twin plate cathode structure comprising at least two cathode bodies (56a, 56b) each including cathode active material portions, an electrode including two cathode current collector portions (58a, 58b) operatively associated with corresponding ones of the cathode bodies, and an intermediate conductor means (60) joining the two collector portions for making electrical connection to the cathode structure. A plurality of twin plate cathode structures are grouped or arranged to provide a cathode cell assembly in which there is provided means (eg. a lead bar) operatively connected to each of the intermediate conductor means (60) for making electrical connection to the cathode structure in the assembly.

14 Claims, 2 Drawing Sheets

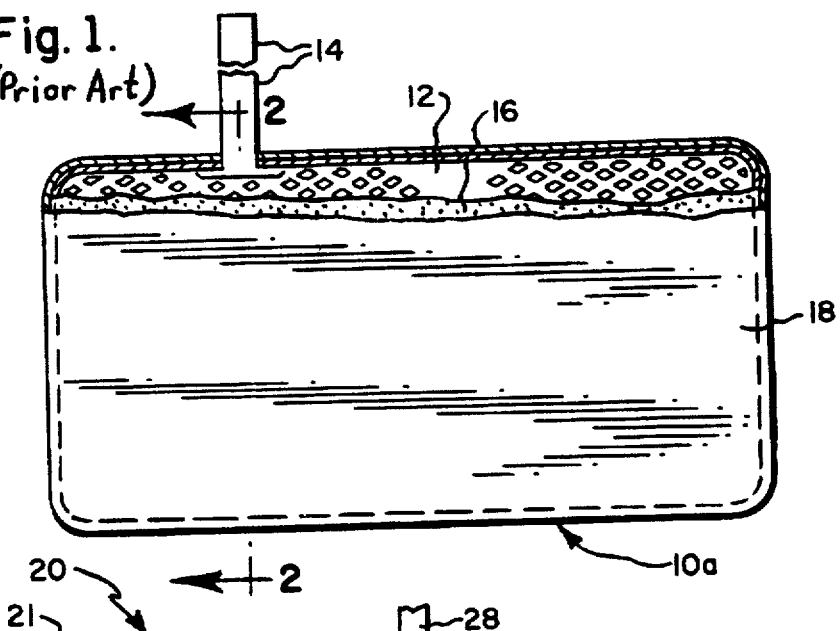
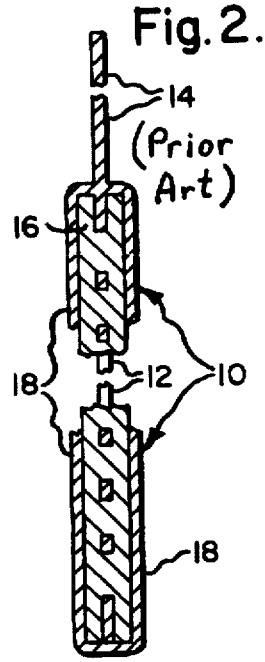
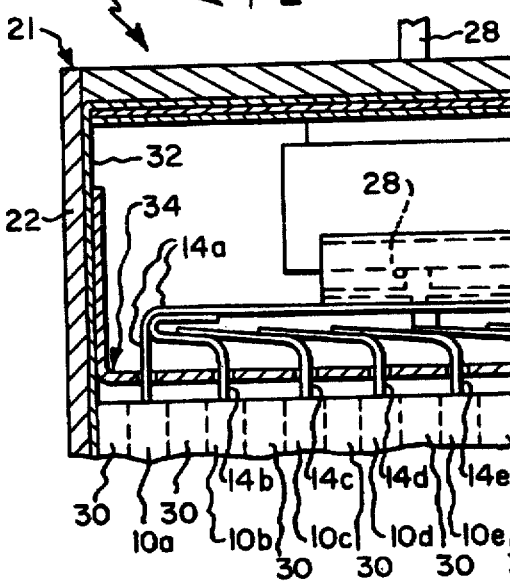
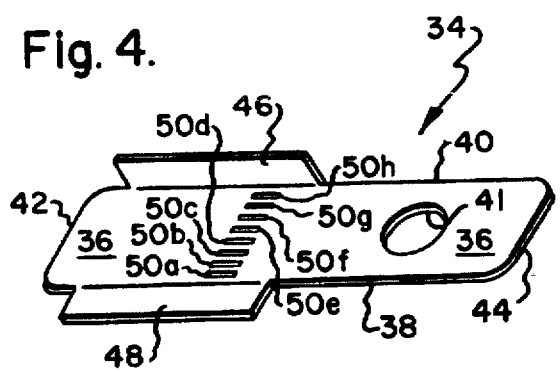
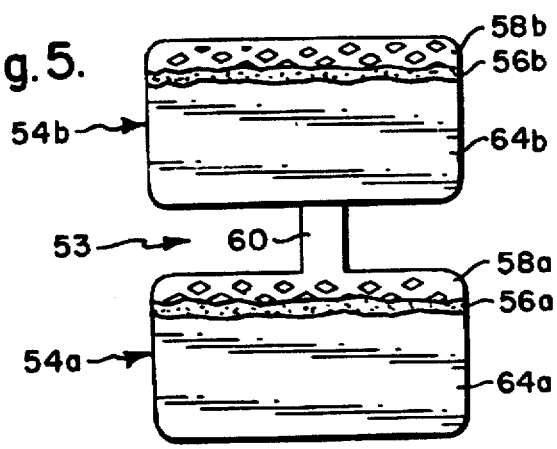

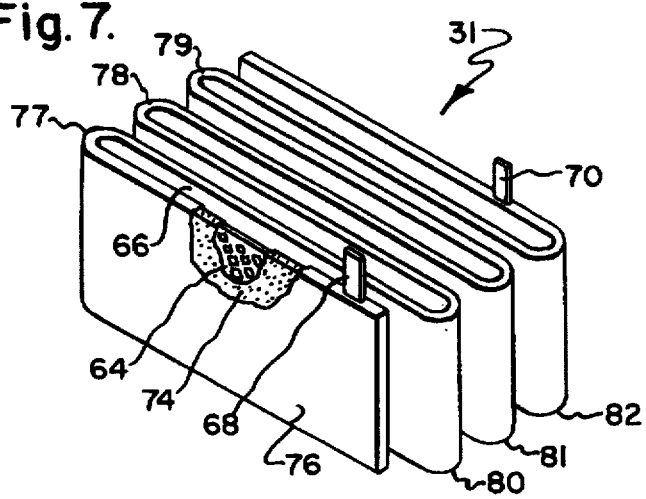
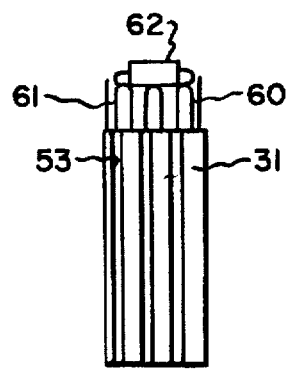
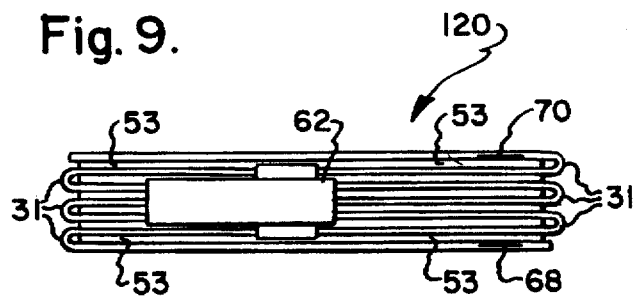
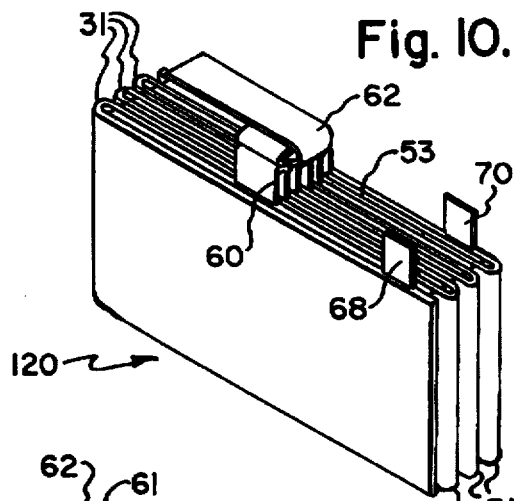
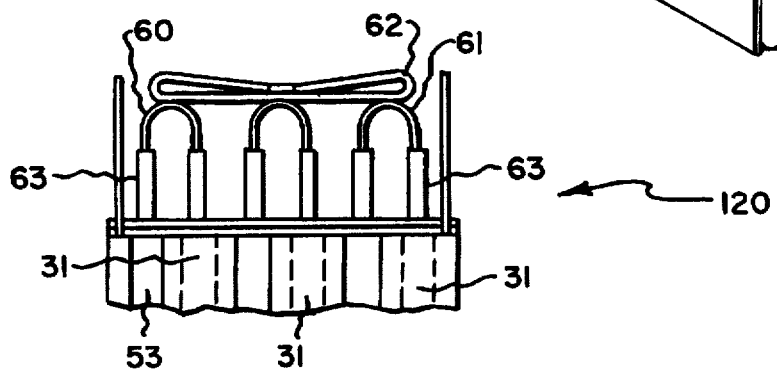
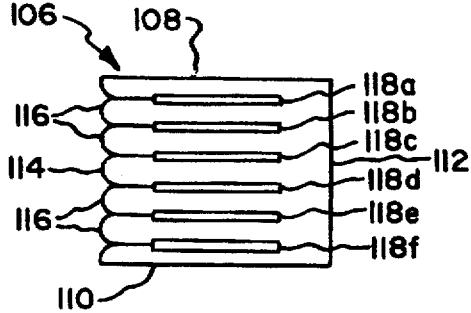
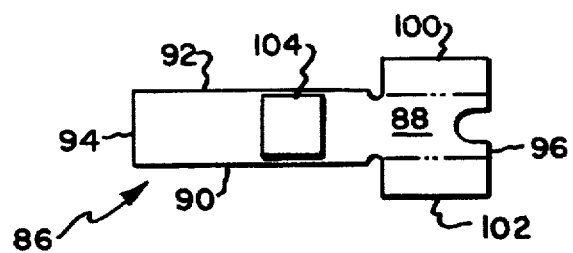

TWIN PLATE CATHODE ASSEMBLY FOR MULTIPLATE, ELECTROCHEMICAL CELLS

This is a continuation of application Ser. No. 07/757,251 filed on Sep. 10, 1991, now abandoned.

FIELD OF THE INVENTION

This invention relates to the art of lithium batteries, and more particularly to a new and improved twin plate cathode structure and assembly method for use in a alkali metal/solid cathode and alkali metal/oxyhalide cell assembly.

BACKGROUND OF THE INVENTION

The principles of the new and improved cathode structure of the present invention can be applied to a variety of alkali metal/solid cathode and alkali metal/oxyhalide cells. For purposes of example, one area of use of the present invention is with a cell for an implantable cardiac defibrillator such as that disclosed in U.S. Pat. No. 4,830,940. Other alkali metal/solid cathode cells which may utilize the cathode structure of the present invention include metal oxide, metal oxide bronze and fluorinated carbon cells.

In general, manufacturing of alkali metal/solid cathode and alkali metal/oxyhalide cells, and especially the defibrillator cell, to the requisite safety and reliability standards in operation is time consuming and costly. Manufacture of the cell stack assembly, for example, in the above-noted defibrillator cell is generally accomplished by first folding the anode to form a serpentine-like structure. Then, individual cathode plates are each received one at a time between the folds of the anode structure. Thereafter each plate lead is bent and welded one at a time to the upper surface of the neighboring lead. During the welding process, each of the leads is positioned through slots in an insulating cover located on the top of the cell stack. This process is very time consuming and adds to the cost of the cell. Therefore, a new and improved twin plate cathode structure that reduces the time required to manufacture the cell stack assembly, while maintaining the requisite safety and reliability standards in operation, would be highly desirable.

SUMMARY OF THE INVENTION

It is, therefore, the primary object of the present invention to provide a new and improved twin plate cathode structure for a cell stack assembly in a multiplated alkali metal/solid cathode or alkali metal/oxyhalide cell.

It is a further object of the present invention to provide such a twin plate cathode structure which improves manufacturing of the cell.

It is a further object of the present invention to provide such a twin plate cathode structure for use in a cell stack assembly in a defibrillator cell.

It is a further object of the present invention to provide such a twin plate cathode structure which is efficient and effective in operation.

The present invention provides a twin plate cathode structure for use in a alkali metal/solid and alkali metal/oxyhalide cell assembly including a plurality of cathode plates operatively associated with anode means, the twin plate cathode structure comprising at least two cathode bodies each including cathode active material portions, an electrode including two cathode current collector portions operatively associated with corresponding ones of the cathode bodies, and an intermediate conductor means joining the two collector portions for making electrical connection to the cathode structure. A plurality of twin plate cathode strutures are grouped or arranged to provide a cathode cell assembly in which there is provided means operatively connected to each of the intermediate conductor means for making electrical connection to the cathode structures in the assembly.

In accordance with one illustration of the present invention, the twin plate cathode structure is used in a cell stack assembly in a defibrillator cell wherein the cathode active material comprises $Ag_xV_2O_y$, x is in the range of from about 0.5 to about 2.0 and y is in the range of from about 4.5 to about 6.0 which advantageously has high volumetric capacity and high rate capability. The anode means comprises a continuous elongated lithium element enclosed within a separator and folded in a serpentine manner into a plurality of sections which are interposed between a plurality of the twin plate cathode structures, each of which individually is enclosed within separator material thereby enhancing the reliability of the cell.

By using the twin plate cathode structure of the present invention in the cell stack assembly, the assembly of the cell is made easier, the alignment of the cathode plates is done automatically and the number of interconnections is reduced, thus simplifying the assembly and welding operation. The reduced weldments also may increase the reliability of the cell by reducing the number of connections susceptible to failure due to vibration and shock.

BRIEF DESCRIPTION OF THE DRAWING FIGURES

FIG. 1 is an elevational view, with parts removed, of a prior art cathode plate, such as that used in the defibrillator cell disclosed in U.S. Pat. No. 4,830,940.

FIG. 2 is a transverse sectional view taken about on line 2—2 in FIG. 1;

FIG. 3 is a fragmentary sectional view of the defibrillator cell disclosed in U.S. Pat. No. 4,830,940.

FIG. 4 is a perspective view of a cell stack insulating cover used in the cell of FIG. 3;

FIG. 5 is an elevational view, with parts removed, of a twin plate cathode structure according to the present invention;

FIG. 6 is a transverse sectional view of the twin plate cathode structure of the present invention taken about on line 6—6 in FIG. 5;

FIG. 7 is a perspective view, with parts removed, of an anode, such as that included in the defibrillator cell of U.S. Pat. No. 4,830,940.

FIG. 8 is a side elevational view of a cell stack assembly including the anode of FIG. 7 and a plurality of twin cathode plate structures of the present invention;

FIG. 9 is a top plan view of the cell stack assembly of FIG. 8 in accordance With the present invention;

FIG. 10 is a perspective view of a cell stack assembly of FIG. 8 in accordance with the present invention;

FIG. 11 is an enlarged fragmentary sectional view of the cell stack assembly in accordance with the present invention;

FIG. 12 is a plan view of a spacer used in the cell stack assembly of FIG. 11 in accordance with the present invention; and FIG. 13 is a plan view of a cell stack insulating cover used in the cell stack assembly in accordance with the present invention.

DETAILED DESCRIPTION OF THE INVENTION

The twin plate cathode structure of the present invention is for use in any multiplated alkali metal/solid cathode and alkali metal/oxyhalide cell assembly Which includes a plurality of cathode plates operatively associated with anode means. Such alkali metal/solid cathode cells include, for example, metal oxide, fluorinated carbon and metal oxide bronze. The cell assembly using the twin plate cathode structures of the present invention may comprise a primary cell. For purposes of illustration only, and not limitation, the twin plate cathode structure of the present invention will be described herein in detail in a cell stack assembly of the type employed in an implantable cardiac defibrillator cell as disclosed in U.S. Pat. No. 4,830,940, which disclosure is hereby incorporated by reference. By using the twin plate cathode structure of the invention in the defibrillator cell stack assembly, assembly of the cell is made easier, thus simplifying manufacturing of the cell. The reliability of the cell is maintained, and even increased because the number of interconnections is reduced, which in turn reduces the number of weldments susceptible to failure during testing due to shock and vibration.

Referring now to the drawings, FIGS. 1–3 show a prior art cathode plate and a plurality of such plates as assembled in a defibrillator cell such as that disclosed in U.S. Pat. No. 4,850,940. Cathode plate 10 comprises a cathode conductor including a body portion 12 and a lead portion 14. The conductor body portion 12 is in the form of a thin sheet of metal screen comprised of any conductive metal or conductive material such as, for example, titanium or stainless steel. Lead portion 14 is in the form of a solid thin tab extending from one side of screen 12. Cathode plate 10 further comprises a body 16 of cathode mixture including cathode active material and binder. The cathode active material is silver vanadium oxide, can include a binder such as Teflon and conductors such as graphite powder and acetylene black powder. Cathode plate 10 can be encased in an envelope 18 of separator material.

With reference to FIG. 3, a total of eight cathode plates 10a–10h are employed in the cell stack assembly. The two outer or end cathode plates are slightly smaller in overall dimension to accommodate the shape of the casing of the defibrillator cell. All of cathode plates 10a–10h are identical in construction to cathode plate 10 shown in FIG. 1. The defibrillator cell, a portion of which is shown at 20, includes a hollow casing 21 having spaced apart side walls 22, 24, spaced apart end walls (not shown) and is closed at the top by a lid 26 welded in place in any known manner. Casing 21 is of metal such as stainless steel and being electrically conductive provides one terminal or contact for making electrical connection between the cell and its load. Lid 26 is also of a stainless steel. The other electrical terminal or contact is provided by a conductor or pin 28 extending from within cell 20 through casing 21, an in particular through lid 26. Pin 28 is insulted electrically from metal lid 26 by an insulator and seal structure (not shown). Anode structure 30 receives cathode plates 10a–10h therein thereby comprising the cell stack assembly, which is received in casing 21 of cell 20.

A first cell stack insulator 32 in the form of a thin elongated band or strip extends along casing sidewalls 22, 24 and bottom wall (not shown) and is located between the inner wall surfaces of the cell stack, particularly the outer surfaces of anode portions 30. A second cell stack insulator (not shown) similar to insulator 32 extends along casing end walls and bottom walls and is between the inner wall surfaces of the casing and the outer end and bottom surfaces of the cell stack. The insulators are provided to prevent internal electrical short circuits.

A cell stack insulating cover 34 is located in the casing adjacent the upper surface of the cell stack and spaced in relation to lid 26, as viewed in FIG. 3. Cover 34, shown in further detail in FIG. 4, has a planer body portion 36 including parallel side edges 38, 40, parallel end edges 42, 44 and curved or rounded corners so as to conform closely to the configuration defined by the inner surfaces of the casing sidewalls. Cover 34 is provided with a pair of flanges or tabs 46, 48 extending from side edges 38, 40 and disposed at about right angles to body 36. Tabs 46, 48 are used to insulate the anode leads from the cathode plates. Body 36 is provided with a plurality of spaced apart, longitudinally disposed slots 50a–50h which are arranged in a row and extend transversely across body 36. Slots 50a–50h are of a size, configuration and location to receive tabs 14a–14h, extending from cathode plates 10a–10h, respectively. Thus, the cathode leads or tabs 14a–14h extend from cathode plates 10a–10h in the stack below cover 34 through slots 50a–50h into the open region between cover 34 and lid 26. Cover body 36 is provided with an opening 41 allowing flow of electrolyte therethrough into the region of the cell stack during the filling procedure.

Each of cathode leads 14a–14h is bent or formed into approximate right angles as shown in FIG. 3. Each leg extends in the same direction with the inner surface of one lead contacting and secured, such as by welding in two places, to the outer surface of the neighboring lead. Lead 14b is bent into a formation including a right angle portion like the other leads and then the outer end is formed into a return bend. Lead 14a is of considerably greater length than the other leads and is bent into a right angle extending in the opposite direction and overlying the remaining leads 14b–14h. Lead 14a is connected to lead 14b as shown in FIG. 3. The remaining end portion of lead 14a extends transversely and is welded in two places to lead 14h. An intermediate lead 52 in the form of a ribbon or strip is fixed at one end to lead 14a and extends longitudinally relative to body 34 and the casing and is provided for connection to terminal pin 28 through the insulator and seal structure, generally shown at 54. During manufacture, approximately 16 welds are necessary to connect the cathode leads 14a–14h. Further, each cathode lead 14a–14b is individually fed through slots 50a–50b in cover 34 prior to bending and welding.

The procedure described above to assemble the leads as shown in FIG. 3 is very time consuming, costly and may require numerous spot welds. Further, if the leads are not cut correctly an upward slope may develop from lead 14h to lead 14a such that the electrodes may not .seat properly, subsequently interfering with closing the cell case. Additionally, the greater the number of weldments, the more susceptible the cell may be to failure during testing due to vibration and shock. These problems are essentially avoided by using the twin plate cathode structure of the present invention in the cell stack assembly. In particular, a cell stack assembly comprising the twin cathode plate structure of the present invention can be substituted for the prior art cell stack assembly used in the defibrillator cell, as shown in FIG. 3. The remaining components and methods of assembly of the defibrillator cell as shown in FIG. 3, will remain the same. For a more detailed description, refer to the discloure of U.S. Pat. No. 4,830,940, which disclosure is hereby incorporated by reference. It is understood, however, that the twin plate cathode structures of the present invention may be used in any alkali metal/solid cathode and alkali metal/oxyhalide cell systems which includes a plurality of cathode plates operatively associated with anode means.

With reference to FIGS. 5 and 6, there is illustrated the twin plate cathode structure of the present invention. The twin cathode plate structure, generally indicated 53 includes two cathode plates 54a and 54b. Cathode plates 54a,54b comprise cathode bodies 56a, 56b and an electrode including two cathode current collector portions 58a, 58b operatively associated with corresponding ones of the cathode bodies 56a, 56b. An intermediate conductor means 60 joins the two current collector portions 58a,58b for making electrical connection to the cathode structure. Referring to FIG. 11, there is illustrated a cell stack assembly comprising a plurality of cathode structures. There is provided means 62 operatively connected to each of the intermediate conductor means 60 of the cathode structures for making electrical connection to the cathode. By way of example, cathode means 62 may comprise a lead bar which is welded in two places to each of leads 60. The current collector portions 58a, 58b may be in the form of a thin sheet of metal screen, for example titanium or stainless steel, and conductor means 60 may be in the form of a solid thin tab extending from one side of screen 58a to one side of screen 58b thereby connecting screen 58a to screen 58b. Cathode bodies 56a, 56b, comprise a cathode mixture including cathode active material and binder. The cathode active material for the illustrative defibrillator cell is silver vanadium oxide, and may include a binder such as Teflon and conductors such as graphite powder and acetylene black powder. The silver vanadium oxide material comprises the formula $Ag_xV_2O_y$, where X is in the range of from about 0.5 to about 2.0, preferably from about 0.95 to about 1.1. Y is in the range of from about 4.5 to about 6.0, and preferably from about 5.0 to about 6.0. A more detailed description on the method of making the silver vanadium oxide cathode is described in U.S. Pat. No. 4,830,940, the methods of which are hereby incorporated by reference. Alternatively, the following method may be used to make the twin plate cathode structures of the present invention. Cathode plate 53 is made by first preparing a cathode mix of active material and binder and then drying the prepared mixture at a particular temperature for a short time prior to use. By way of example the cathode mix comprises 94 weight percent $Ag_xV_2O_y$, three weight percent Teflon powder, two weight percent graphite powder and one weight percent carbon. This ratio of dry materials is thoroughly mixed in a ball mill and dried overnight at 140° C. for use. The twin plate cathode structure is then formed by placing half the approximate weight of the foregoing cathode mixture in a pressing fixture placing the cathode screen on the top of the mixture, adding the remaining cathode mix. The top half of the pressing fixture is inserted and pressure applied for example, 36,000–38,000 lbs. per square inch for about 45 seconds. Alternatively, the entire mixture can be placed on the screen in a manner allowing about half to pass through into the lower portion of the fixture. Two such plates are formed in the one of the manners and previously described connected by conductor means 60, which is welded to each of the plates. The cathode screens and conductor means may also be fabricated out of a sheet of metal as a single unit. A more detailed description of preparing the cathode plates is described in U.S. Pat. No. 4,830,940, which disclosure is hereby incorporated by reference.

After preparation of the mixture and pressing onto cathode current collector portions 58a, 58b, the cathode bodies and associated electrode portion are encased in a separator material 64a, 64b, for example, polypropylene or polyethylene. By way of example, separator material 64a, 64b may comprise a single layer of commercially available Celgard non-woven polypropylene separator material which is pressed on the cathode plates and heat sealed around the edges. All other twin plate cathode structures used in the cell stack assembly are identical in construction to the twin plate cathode structure shown in FIG. 5. The dimensions of the cell stack assembly including the plurality of twin plate cathode structures of the present invention will vary based on cell type. The twin plate cathode structure shown in FIG. 5 is for use in a cell stack assembly including a plurality of such structures, operatively associated with anode means. Anode means, shown generally at 31 in FIG. 8, will be described in detail hereinafter.

With reference to FIG. 7 there is illustrated anode means generally indicated 31, which in conjunction with a plurality of twin plate cathode structures of the present invention form the cell stack assembly. Anode means 31 comprises a continuous elongated element or structure of alkali metal, preferably lithium or lithium alloy, enclosed within separator material and folded into a plurality of sections which are interposed between the twin plate cathode structures. Referring now in detail to FIG. 7, anode means 31 comprises an elongated continuous ribbon like anode conductor element 64 in the form of a thin metal screen, for example nickel. Conductor 64 includes at least one terminal or contact tab extending therefrom. In the anode structure for use in the cell stack assembly of the defibrillator cell there are two tabs 68, 70 extending out from opposite side edges of conductor 64. Anode 31 further comprises a pair of elongated ribbon-like lithium elements 74 pressed together against opposite sides of conductor element 64 to form an anode structure. Lithium elements 74 are substantially equal in width and length to conductor element 64. The resulting anode structure is a sandwiched-like construction with conductor 64 between lithium elements 74. Anode means 31 further comprises a separator material 76 encapsulating the anode structure. The anode structure comprising conductor 64 and lithium elements 74 is enclosed or wrapped in an envelope of separator material, for example polypropylene or polyetheylene. The resulting anode structure 31 is folded at spaced intervals along the length thereof to form a serpentine-like structure which receives between the folds thereof the plurality of twin plate cathode structures to form the cell stack assembly. In particular, anode means 31 is folded at the intervals 77, 78, 79, 80, 81 and 82 along the length thereof. The twin plate cathode structures of the present invention are received between the folds in anode 31, which will be described hereinafter, to form the cell stack assembly which is received in the casing of the cell such as that shown and described in FIG. 3.

With reference to FIG. 12, there is shown a spacer lead generally indicated 106, having parallel side edges 108, 110, and end edges 112, 114 joining side edges 108, 110 and extending perpendicular thereto. Side edge 114 is formed to include a plurality of curved or rounded portions 116. Spacer 106 is also provided with a plurality of spaced apart, longitudinally disposed slots 118a–118f which are arranged in a row extending transversely across spacer 106. Slots 118a–118f are of a size and configuration to receive tabs 60 which extend from twin plate cathode structures 53, which will become more apparent during the ensuing description of the method of assembling the cell stack assembly. Spacer lead 106 can be made of Tefzel or Halar material in the illustrative cell stack assembly of the present invention.

With reference to FIG. 13, there is illutrated an insulating cover generally shown at 86, which is similar to insulating cover 34 in FIG. 4. Cover 86 has a planar body portion 88 including parallel side edges 90, 92 and parallel end edges 94, 96. Cover 34 is provided with a pair of flanges or tabs 100, 102 extending from side edges 90, 92 and disposed at about right angles to body 88. Tabs 100, 102 are used to insulate the anode leads from the cathode plates. Body 88 is provided with a substantially rectangular opening 104 for receiving tabs 60 of twin plate cathode structures 53 therethrough. Insulator 86 is provided to prevent internal electrical short circuits and can be made of Tefzel or Halar material in the illustrative cell stack assembly of the present invention.

The cell stack assembly generally designated 120 in FIGS. 8–11 is assembled using a plurality of cathode structures of the present invention interposed between anode means 31 in the following manner. Anode 31 is folded into a serpentine like assembly as shown in FIG. 7 using a conventional pressing apparatus. Twin plate cathode structure 53 shown in FIG. 5 is shaped by bending such that lead portion 60 is rounded at the upper portion thereof as shown at 61 in FIG. 8 and plates 54a, 54b are juxtaposed in facing spaced, parallel relation to one another. It is understood that any number of twin cathode plate structures may be utilized in the cell stack assembly depending on cell requirements. In the illustrative defibrillator cell, the cell stack assembly comprises three twin plate cathode structures of the present invention. After each of the three twin plate cathode structures is shaped as previously described they are inserted between the folds of anode 31. Cell stack insulating cover 86 is then positioned in place with each of the three leads 60 extending through opening 104. Spacer 106, (FIG. 12), is then positioned in place such that each leg portion 63 (FIG. 11) is positioned through the corresponding slot 118a–118f. Thereafter, transverse bar 62 is welded to each of the leads 60 in two places laterally of the bar such that bar 62 horizontally extends across each of leads 60 to thereby facilitate connection between the three twin plate cathode structures. The cell stack assembly 120 is then inserted into the casing of a cell such as that shown in FIG. 3, in the manner disclosed in U.S. Pat. No. 4,830,940, which is hereby incorporated by reference.

It is apparent that the present invention accomplishes its intended objects. By using the twin plate cathode structure of the present invention in the cell stack assembly, the assembly of the cell is made easier, the alignment of the cathode plates is done automatically and the number of interconnections is reduced, thus simplifying the assembly and welding operation. The reduced weldments also may increase the reliability of the cell by reducing the number of connections susceptible to failure due to vibration and shock. It will be understood that the foregoing description and illustration is by way of example only and that any such modifications and/or changes as may suggest themselves to those skilled in the art are intended to fall within the scope of the present invention as defined by the appended claims.

What is claimed is:

1. A method of forming a cell stack assembly including a plurality of twin plate cathode structures operatively associated with anode means, said cell stack assembly or use in an alkali metal/solid cathode cell and an alkali metal/oxyhalide cell for delivering successive high current pulses and rapidly recovering the cell open circuit voltage, comprising:

folding said anode means into a serpentine-like assembly using a conventional pressing apparatus;

shaping each of said twin plate cathode structures by bending such that the lead portions extending therefrom are rounded at the upper end thereof and the twin plates are juxtaposed in a facing, spaced parallel and adjacent relation to one another with the lead portions in spaced-apart, non-contacting relation;

inserting said shaped twin plate cathode structures between the folds of said anode means such that each fold has a cathode structure between;

positioning a spacer in place;

positioning an insulating cover in place; and welding a transverse bar to each of the spaced-apart lead portions in at least two places laterally of the bar such that the bar extends longitudinally across the lead portions.

2. A cell stack assembly for use in an alkali metal/solid cathode cell and an alkali metal/oxyhalide cell for delivering successive high current pulses and rapidly recovering the cell open circuit voltage, comprising:

a plurality of twin plate cathode structures, each of said twin plate structures including: a pair of adjacent cathode bodies each having cathode active material portions; and an electrode including two adjacent current collector portions operatively associated with corresponding ones of the cathode bodies and an intermediate conductor means joining the two collector portions;

said twin plate cathode structure being arranged so that said intermediate conductor means are in spaced-apart, non-contacting relation;

anode means comprising a continuous elongated alkali metal element enclosed within a separator material and folded into a plurality of sections interposed between said twin plate cathode structures; and means operatively connected to each of said spaced-apart intermediate conductor means for making electrical connection to said cathode structures.

3. The cell stack assembly of claim 2, wherein said assembly further comprises a spacer positioned adjacent said intermediate conductor means, said spacer comprising:

a body portion having parallel side edges and end edges joining said side edges and extending perpendicular thereto; and a plurality of spaced apart longitudinally disposed slots arranged in a row extending transversely across said body portion, said slots positioned adjacent said intermediate conductor means in said cell stack assembly.

4. The cell stack assembly of claim 2, wherein said assembly further comprises an insulating cover for preventing internal electrical short circuits, said cover comprising:

a planar body portion including parallel side edges and parallel end edges;

a pair of flanges extending from said side edges ad disposed at about right angles to said body portion; and a substantially rectangular opening on said body portion for receiving said intermediate conductor means therethrough.

5. The cell stack assembly of claim 2, further comprising a separator material encasing the cathode bodies and associated electrode portions.

6. The cell stack assembly of claim 2, wherein said cathode material is selected from the group consisting of a metal oxide, metal oxide bronze or fluorinated carbon.

7. The cell stack assembly of claim 6, wherein said cathode material is metal oxide bronze.

8. The cell stack assembly of claim 7, when said metal oxide bronze is silver vanadium oxide $Ag_xV_2O_y$, wherein x is in the range from about 0.5 to about 2.0 and y is in the range from about 4.5 to about 6.0.

9. The cell stack assembly of claim 8, wherein said metal oxide bronze is silver vanadium oxide $Ag_xV_2O_y$, wherein x is in the range from about 0.95 to about 1.1 and y is in the range from about 5.0 to about 6.0.

10. The cell stack assembly of claim 4, wherein said cathode active material is pressed onto said collector portions in the form of a pellet.

11. The cell stack assembly of claim 4, wherein said alkali metal is lithium.

12. The cell stack assembly of claim 4, wherein said anode means further includes at least one terminal tab extending therefrom.

13. The cell stack assembly of claim 4, wherein said cell is an alkali metal non-aqueous silver vanadium oxide cell.

14. The cell stack assembly of claim 4, wherein said cathode is oxyhalide.

* * * * *

UNITED STATES PATENT AND TRADEMARK OFFICE
CERTIFICATE OF CORRECTION

PATENT NO. : 5,716,735
DATED : February 10, 1998
INVENTOR(S) : Barry Muffoletto et al It is certified that error appears in the above-indentified patent and that said Letters Patent is hereby corrected as shown below:

Col. 7, line 61 - "or" should be --for--.
Col. 8, line 55 - "ad" should be --and--.

Col. 9, line 9 - change "claim 4" to --claim 2--.

Col. 10, line 1 - change "claim 4" to --claim 2--.

Col. 10, line 3 - change "claim 4" to --claim 2--.

Col. 10, line 6 - change "claim 4" to --claim 2--.

Col. 10, line 8 - change "claim 4" to --claim 2--.

Signed and Sealed this

Thirty-first Day of August, 1999

Attest:

Q. TODD DICKINSON

*Attesting Officer*     *Acting Commissioner of Patents and Trademarks*